United States Patent
Cheng et al.

(10) Patent No.: US 6,791,631 B2
(45) Date of Patent: Sep. 14, 2004

(54) PIXEL STRUCTURE OF THIN-FILM TRANSISTOR LIQUID CRYSTAL DISPLAY INCLUDING STORAGE CAPACITOR FORMED UNDER SIGNAL LINE

(75) Inventors: Hsin-An Cheng, Kaohsiung (TW); Chaung-Ming Chiu, Taoyuan (TW)

(73) Assignee: Toppoly Optoelectronics Corp., Miao-Li County (TW)

( * ) Notice: Subject to any disclaimer, the term of this patent is extended or adjusted under 35 U.S.C. 154(b) by 1 day.

(21) Appl. No.: 10/249,422

(22) Filed: Apr. 8, 2003

(65) Prior Publication Data

US 2004/0051821 A1 Mar. 18, 2004

(30) Foreign Application Priority Data

Sep. 13, 2002 (TW) ........................................ 91120950 A

(51) Int. Cl.[7] ........................ G02F 1/1343; G02F 1/136; H01L 29/04
(52) U.S. Cl. .............................. 349/39; 349/43; 349/44; 257/59; 257/72
(58) Field of Search ........................ 349/38, 39, 42–44; 257/59, 72

(56) References Cited

U.S. PATENT DOCUMENTS

| | | | | |
|---|---|---|---|---|
| 6,665,024 B2 | * | 12/2003 | Kurashina | ..................... 349/39 |
| 6,677,613 B1 | * | 1/2004 | Yamazaki et al. | ............. 257/72 |
| 2002/0180901 A1 | * | 12/2002 | Kim | ............................ 349/43 |
| 2003/0206265 A1 | * | 11/2003 | Yasukawa et al. | .......... 349/187 |

* cited by examiner

Primary Examiner—Tarifur R. Chowdhury
(74) Attorney, Agent, or Firm—Jiang Chyun IP Office

(57) ABSTRACT

A pixel structure of a thin-film transistor liquid crystal display. A storage capacitor is formed by simultaneously defining a doped polysilicon layer, a dielectric layer and shielding metal layer and a source/drain region of a low-temperature polysilicon thin-film transistor. The shielding metal layer is formed on the doped polysilicon layer and is electrically connected to a pixel electrode. As the area occupied by the shielding metal layer is the area of the storage capacitor, the aperture ratio is greatly enhanced.

11 Claims, 11 Drawing Sheets

PIXEL STRUCTURE OF THIN-FILM TRANSISTOR LIQUID CRYSTAL DISPLAY INCLUDING STORAGE CAPACITOR FORMED UNDER SIGNAL LINE

CROSS REFERENCE TO RELATED APPLICATIONS

This application claims the priority benefit of Taiwan application serial no. 91120950, filed Sep. 13, 2002.

BACKGROUND OF INVENTION

1. Field of the Invention

The invention relates in general to a pixel structure of a thin-film transistor (TFT) liquid crystal display (LCD), and more particularly, to a pixel structure of a low-temperature polysilicon thin-film transistor liquid crystal display (LTPS TFT-LCD) with a high aperture ratio.

2. Related Art of the Invention

The LTPS TFT-LCD is different from conventional amorphous (a-Si) TFT-LCD in that the electron mobility is over 200 $cm^2$/V-sec and the smaller area meets the requirement of high aperture ratio. Therefore, problems of reduction of brightness and overall power consumption of the display are resolved in the LTPS TFT-LCD. In addition, the increase of electron mobility integrates a part of the driver circuit and the thin-film transistor on the same glass substrate, such that the reliability of the LCD panel is significantly improved. Therefore, the fabrication cost of the LTPS TFT-LCD is much less than that of the conventional a-Si TFT-LCD. In addition, the LTPS TFT-LCD further has the advantages of thinness, light weight, high resolution and can be applied to power-saving and mobile products.

Referring to FIG. 1, in a pixel structure of a conventional TFT-LCD, a storage capacitor is composed of a pixel electrode and a scan line. The pixel structure of the TFT-LCD comprises a pixel 100, a scan line 106 for driving the pixel 100, and a signal line 108 for driving the pixel 100. The pixel 100 comprises a thin-film transistor 102 and a pixel electrode 104. The thin-film transistor 102 comprises a gate 102a and a source/drain region 102b. In the thin-film transistor 102, the gate 102a and the scan line 106 are electrically connected. The source/drain region 102b has one side connected to the signal line via the plug 112a and the other side connected to the pixel electrode 104 via the plugs 112b and 114.

In addition, the pixel electrode 104 is located in a region between the neighboring signal lines 108 and the neighboring scan lines 106, 106a, while a portion of the pixel electrode 104 overlaps with the adjacent scan line 106a to form a storage capacitor 110. The capacitance of the storage capacitor 110 is determined according to the overlapping area of the pixel electrode 104 and the scan line 106a, and the thickness of the dielectric layer (not shown) formed between the pixel electrode 104 and the scan line 106a.

Referring to FIG. 2, a schematic drawing of a storage capacitor composed of a pixel electrode and a common line of a pixel structure of a conventional TFT-LCD is shown. The pixel structure comprises a pixel 200, a scan line 206 for driving the pixel 200, and a signal line for driving the pixel 200. The pixel 200 is composed of a thin-film transistor 202 and a pixel electrode 204, while the thin-film transistor 202 comprises a gate 202a and a source/drain region 202b. In the thin-film transistor 202, the gate 202a is electrically connected to the scan line 206, and one side of the source/drain region 202b is electrically connected to the signal line 208 via the plug 212a and the other side connected to the pixel electrode 204 via the plugs 212b and 214.

In addition, a common line 216 is formed on the region between the neighboring scan lines 206, and the pixel electrode 204 is formed on the region between the neighboring signal line 208 and the neighboring scan line 206. The overlap between the pixel electrode 208 and the common line 216 constructs a storage capacitor 210. The capacitance of the storage capacitor 210 is determined according to the area of the overlap of the pixel electrode 204 and the common line 216, and the thickness of the dielectric layer (not shown) formed between the pixel electrode 204 and the common line 216.

In the storage capacitor structure constructed by the pixel electrode and the scan line, a very broad line width of the scan line is reserved to obtain sufficient capacitance. This causes the problem of reduced aperture ratio. The same problem exists for the storage capacitor formed by the pixel electrode and the common line.

In addition, the fringe field between the neighboring pixels causes the rearrangement of the liquid crystal molecules; and consequently, results in pixel fringe leakage. Therefore, a black matrix (BM) has to be formed on the opposing substrate, that is, the color filter substrate, to shield the leakage area. The black matrix formed on the color filter substrate also reduces the aperture ratio.

SUMMARY OF INVENTION

The present invention provides a pixel structure of low-temperature polysilicon thin-film transistor liquid crystal display with a high aperture ratio.

The low-temperature polysilicon thin-film transistor liquid crystal display provided by the present invention comprises a pixel, a scan line, a signal line and a storage capacitor. The pixel comprises a low-temperature polysilicon thin-film transistor and a pixel electrode. The scan line and the signal line are used to drive the low-temperature polysilicon thin-film transistor. The storage capacitor comprises a doped polysilicon layer, a dielectric layer and a shielding metal layer and is electrically connected to the pixel electrode.

The above doped polysilicon layer of the storage capacitor and the polysilicon layer of the low-temperature polysilicon thin-film transistor are defined in the same step. The shielding metal layer does not only have the light-shielding function, but also functions to form the storage capacitor by coupling the doped polysilicon layer.

In the present invention, the low-temperature polysilicon layer has a gate and a source/drain region. The gate is electrically connected to the scan line. One side of the source/drain region is electrically connected to the signal line, and the other side of the source/drain region is electrically connected to the pixel electrode. In addition, the source/drain region includes N-type or P-type dopant.

In the present invention, the shielding metal layer includes molybdenum-tungsten alloy, chromium, molybdenum or other material with both shielding and conductive effects. The shielding metal layer does not overlap with the signal line; and therefore, no parasitic capacitor is induced between the shielding metal layer and the signal line.

In the present invention, the storage capacitor is located under the signal line. The doped polysilicon layer has an opening located under the signal line. The formation of the opening allows the overlapping region of the doped polysilicon layer and the signal line to be reduced, such that the parasitic capacitance between the doped polysilicon layer and the signal line is consequently reduced.

The doped polysilicon layer of the storage capacitor includes N-type or P-type dopants. In addition, the doped polysilicon layer is connected to a common voltage Vcom.

BRIEF DESCRIPTION OF DRAWINGS

These, as well as other features of the present invention, will become more apparent upon reference to the drawings wherein.

DETAILED DESCRIPTION

Figure 1:
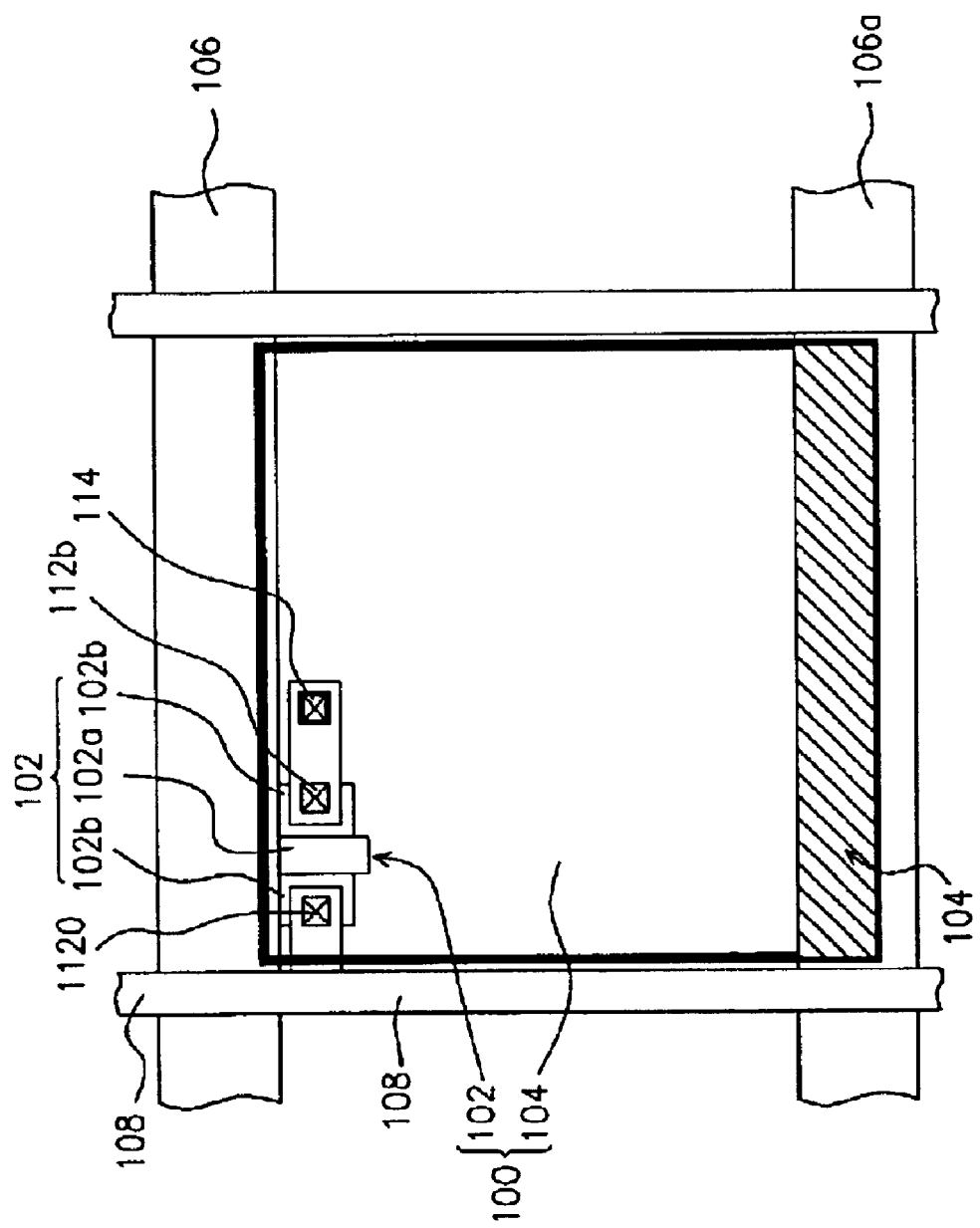
FIG. 1 shows a storage capacitor composed of a pixel electrode and a scan line in a pixel structure of a conventional thin-film transistor liquid crystal display.
Figure 2:
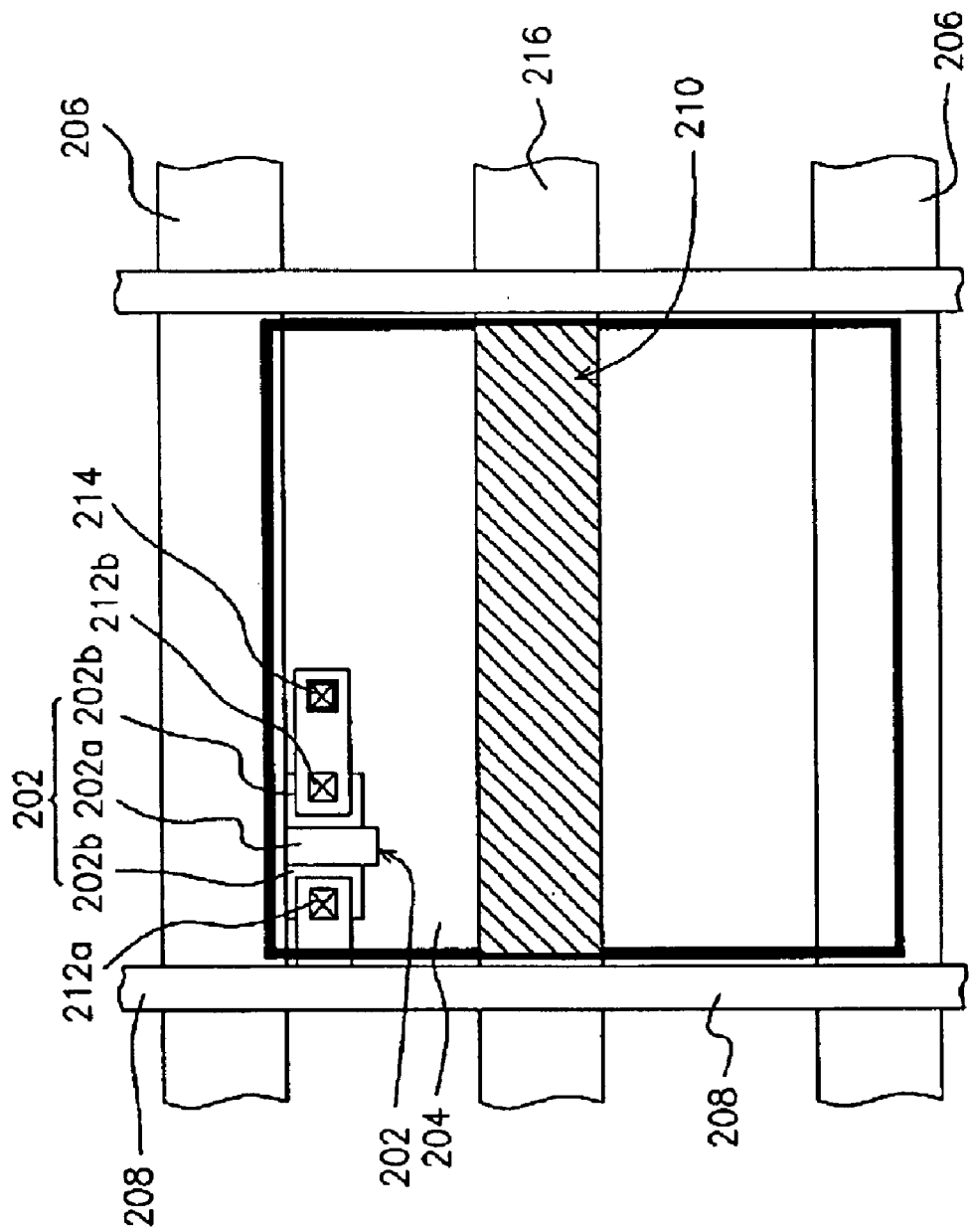
FIG. 2 shows a storage capacitor composed of a pixel electrode and a common line in a pixel structure of a conventional thin-film transistor liquid crystal display.
Figure 3:
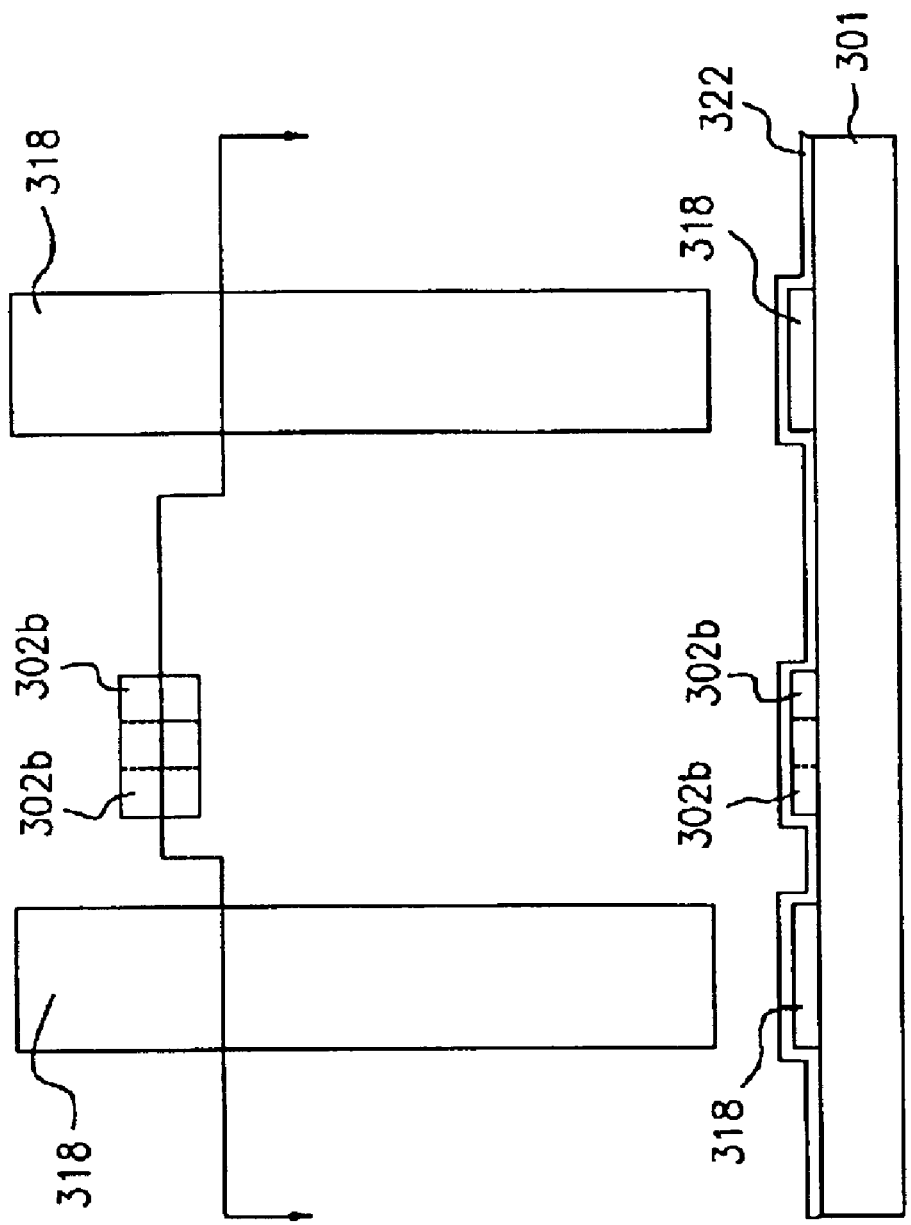
FIGS. 3 to 8 show the fabrication process of a low-temperature polysilicon thin-film transistor array substrate.

FIGS. 3 to 8 show the fabrication process of a low-temperature polysilicon thin-film transistor array substrate according to one embodiment of the present invention. Referring to FIG. 3, a patterned polysilicon layer is formed on a transparent substrate 301. The polysilicon layer is doped with ions to form a source/drain region 302b and a doped polysilicon layer 318. The doping ions include N-type or P-type dopants. After forming the source/drain region 302b and the doped polysilicon layer 318, a dielectric layer 322 is formed on the transparent substrate 301 to cover the source/drain region 302b and the doped polysilicon layer 318. The above dielectric layer 322 is formed of dielectric material such as silicon nitride and silicon oxide.

Figure 4:
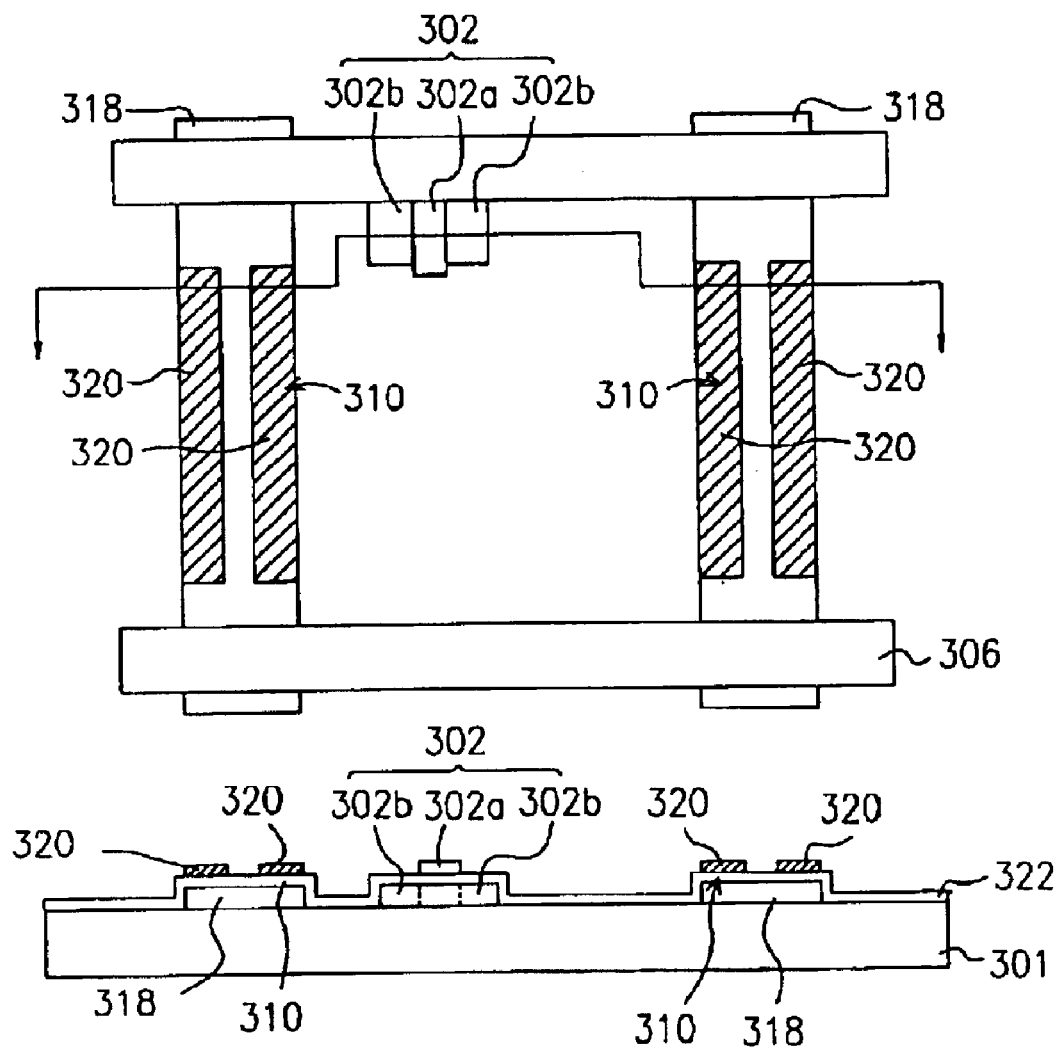

Referring to FIG. 4, a gate 302a, a scan line 306 and a shielding metal layer 320 are formed. The gate 302a is coupled to the scan line 306, and the shielding metal layer 320 is formed on a part of the doped polysilicon layer 318. The overlapping portion of the shielding metal layer 320, the dielectric layer 322 and the doped polysilicon layer 318 construct a storage capacitor 310. The material for forming the shielding metal layer 320 includes molybdenum-tungsten alloy, chromium, molybdenum, or other material with both shielding and conductive characteristics.

Figure 5:
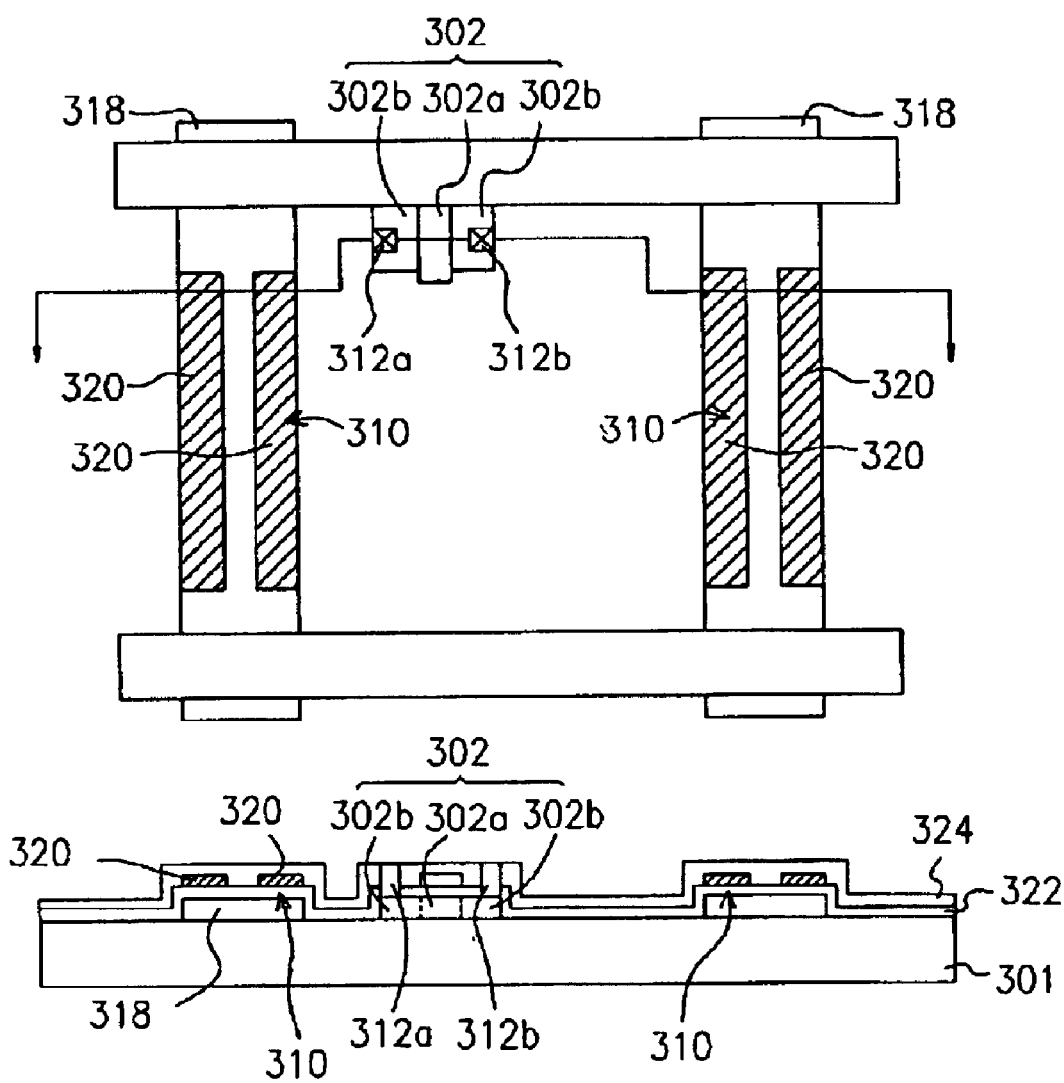

Referring to FIG. 5, a dielectric layer 324 is formed over the transparent substrate 301 to cover the gate 302a, the scan line 306 and the shielding metal layer 320. The material for forming the dielectric layer 324 includes dielectric material such as silicon nitride or silicon oxide. Plugs 312a and 312b are then formed on the source/drain region 302b as the contact of the source/drain region (S/D contact).

Figure 6:
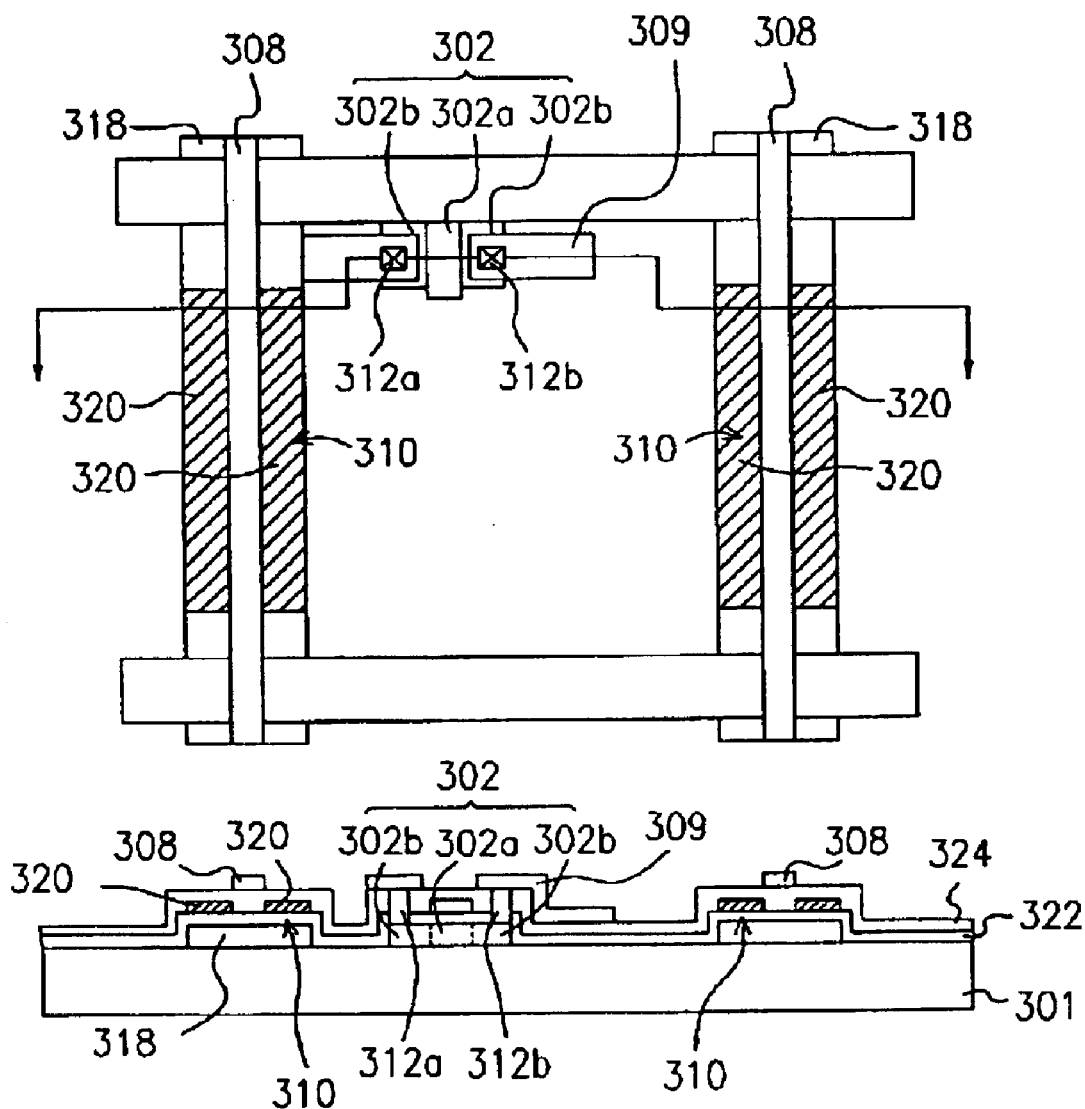

Referring to FIG. 6, a signal line 308 and a line 309 are formed on the dielectric layer 324. The signal line 308 is connected to one side of the source/drain region 302b via the plug 312a, while the line 309 is connected to the other side of the source/drain region 302b via the plug 312b.

Figure 7:
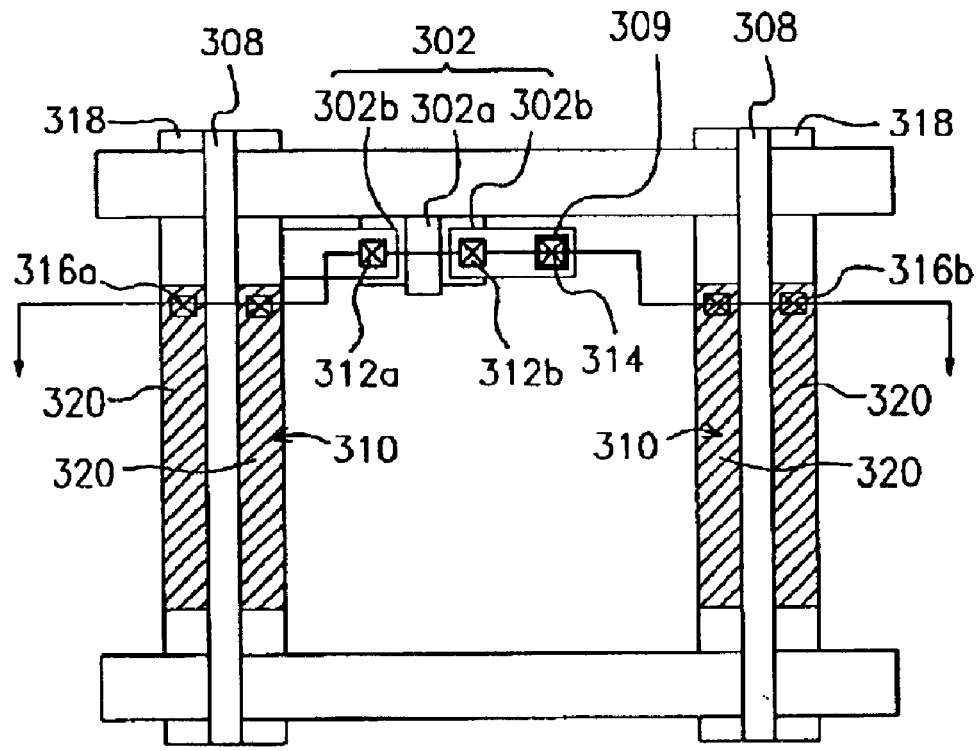
Figure 7:
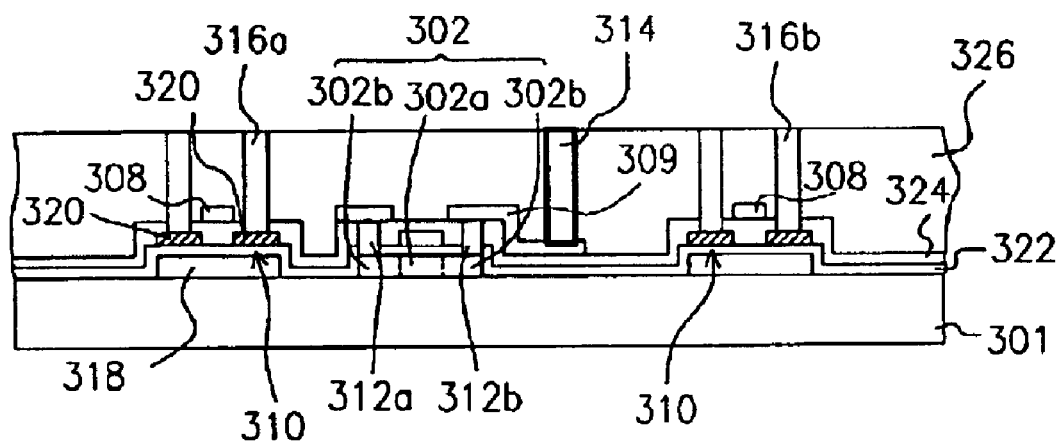

Referring to FIG. 7, a dielectric layer 326 is formed over the transparent substrate 301. For example, the dielectric layer 326 has a planar top surface, and the material for forming the dielectric layer 326 includes dielectric material such as silicon nitride or silicon oxide. Plugs are then formed on the shielding metal layer 320 through the dielectric layers 324 and 326.

Figure 8:
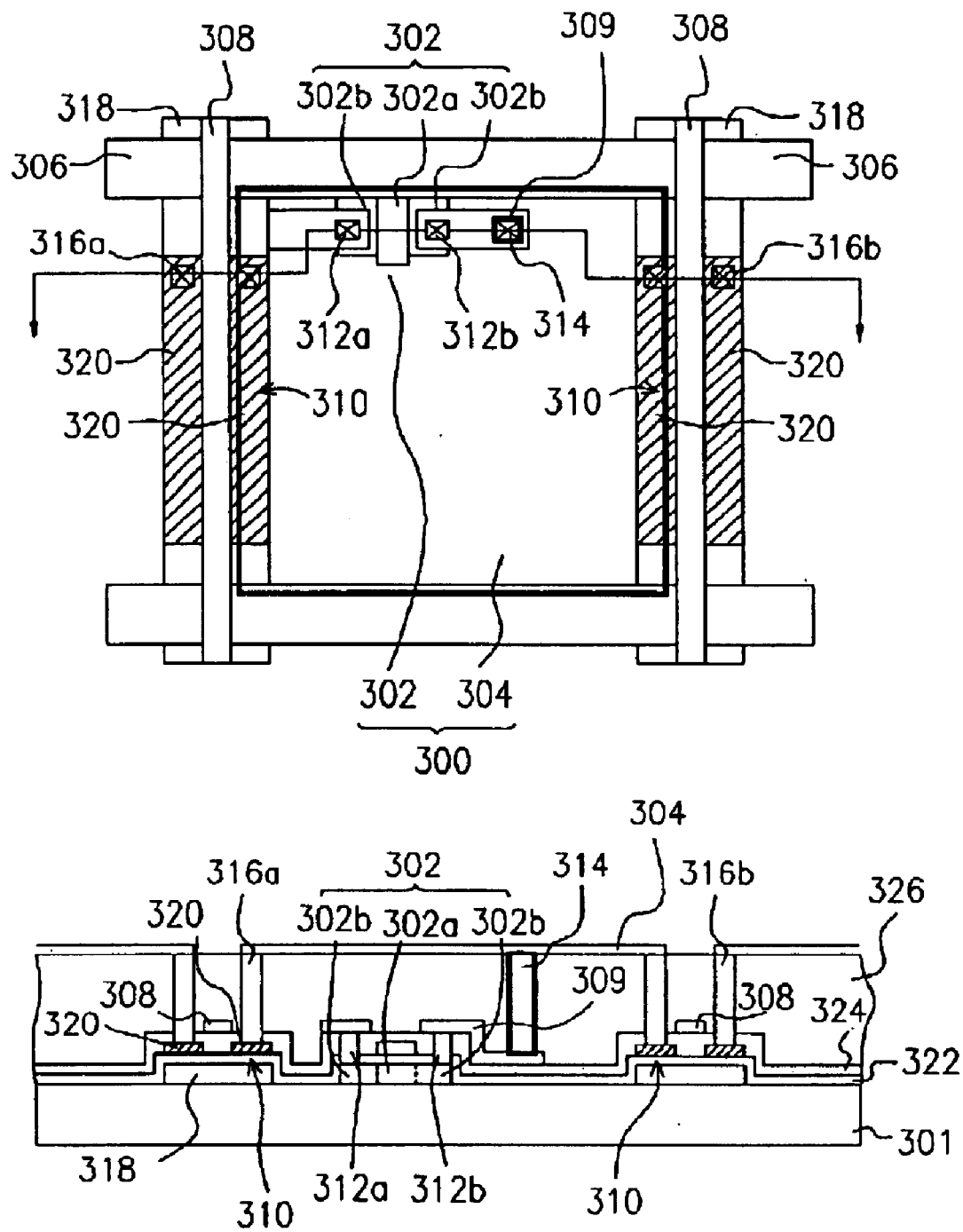

Referring to FIG. 8, a pixel electrode 304 is formed on the dielectric layer 326. The pixel electrode 304 is electrically connected to the source/drain region 302b via the plug 314, the line 309 and the plug 312b. The pixel electrode is further electrically connected to the shielding metal layer 320 via the plugs 316a and 316b. The material for forming the pixel electrode 304 includes transparent conductive material such as indium tin oxide (ITO).

It is clearly shown in FIG. 8 that the pixel structure of the low-temperature polysilicon transistor liquid crystal display in this embodiment comprises a pixel 300, a scan line 306 for driving the pixel 300 and a signal line 308 for driving the pixel.

The allocations of the pixel 300, the scan line 306 and the signal line 308 are described first. The pixel 300 includes a thin-film transistor 302 and a pixel electrode 304. The thin-film transistor 302 includes the gate 302a and the source/drain region 302b. In the thin-film transistor 302, the gate 302a is electrically connected to the scan line 306, one side of the source/drain region 302b is electrically connected to the signal line 308 via the plug 312a, and the other side of the source/drain region 302b is electrically connected to the pixel electrode 304 via the plug 312b, the line 309 and the plug 314.

The storage capacitor 310 is further described as follows. The doped polysilicon layer 318 is formed on the transparent substrate 301 underneath the signal line 308, while a shielding metal layer 320 is formed over the doped polysilicon layer 318. The overlapping portion of the doped polysilicon layer 318 and the shielding metal layer 320 constructs the storage capacitor 310. The material for forming the shielding metal layer 320 includes molybdenum-tungsten alloy, chromium, molybdenum, or other material with both shielding and conductive functions. In addition, the shielding metal layer 320 is electrically connected to the pixel electrode 304 via the plugs 316a and 316b, and the doped polysilicon layer 318 is connected to a common voltage Vcom.

In addition, the shielding metal layer 320 is distributed over the doped polysilicon layer 318 at two sides of the signal line 308. As the shielding metal layer 320 is distributed at the edge of the pixel, the shielding metal layer 320 suppresses the leakage caused by the fringe field at the edge of the pixel, and also forms the storage capacitor 310 by coupling the doped polysilicon layer 318. Further, as the area of the storage capacitor 310 is equivalent to the coverage of the shielding metal layer 320, no additional area is occupied thereby, so that the aperture ratio is greatly enhanced.

Figure 9:
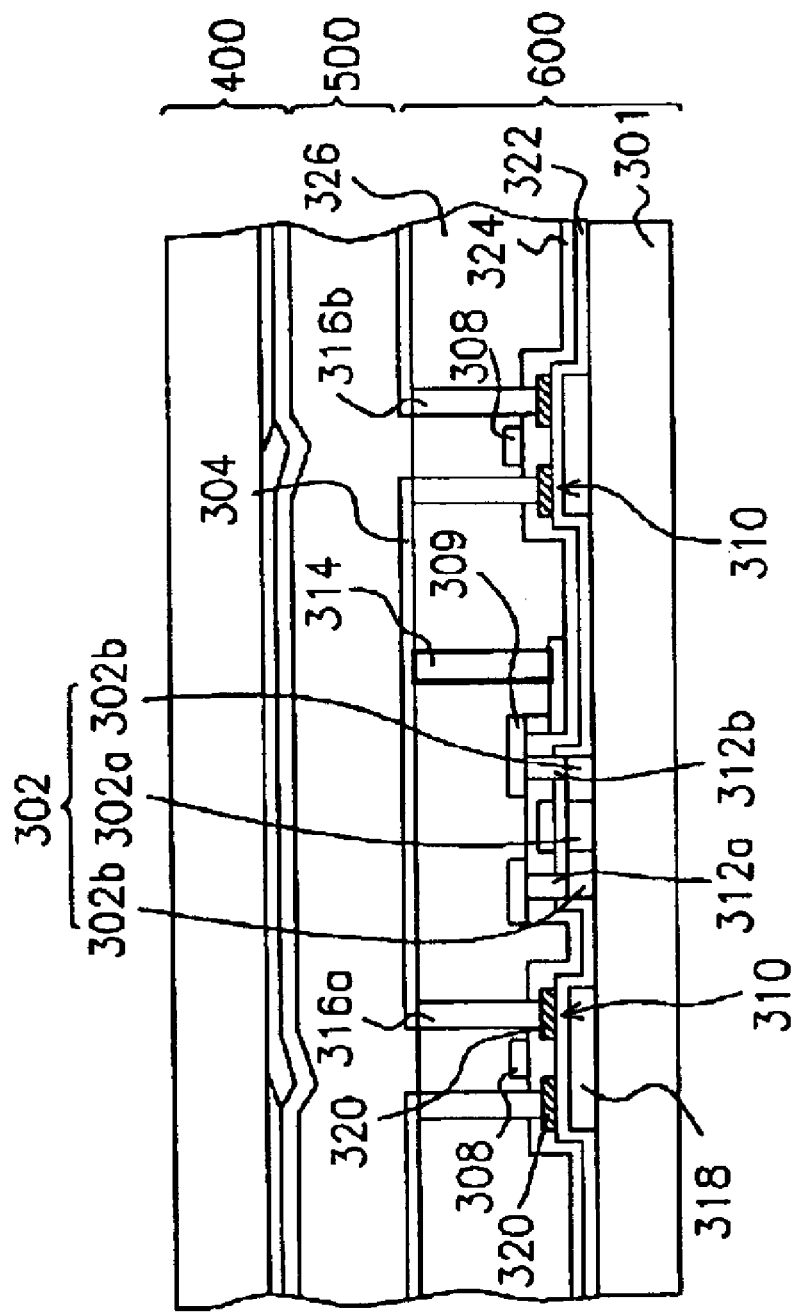
FIG. 9 shows a cross sectional view of a low-temperature polysilicon thin-film transistor liquid crystal display.

Referring to FIG. 9, a cross sectional view of a low-temperature polysilicon thin-film transistor liquid crystal display (LTPS TFT-LCD) is illustrated. The LTPS TFT-LCD includes a color filter array substrate 400, a liquid crystal layer 500 and a TFT array substrate 600. It is clearly seen from FIG. 9 that the shielding metal layer 320 does not overlap with the signal line 308, so that the parasitic capacitance between the shielding metal layer 320 and the signal line is greatly suppressed.

Figure 10:
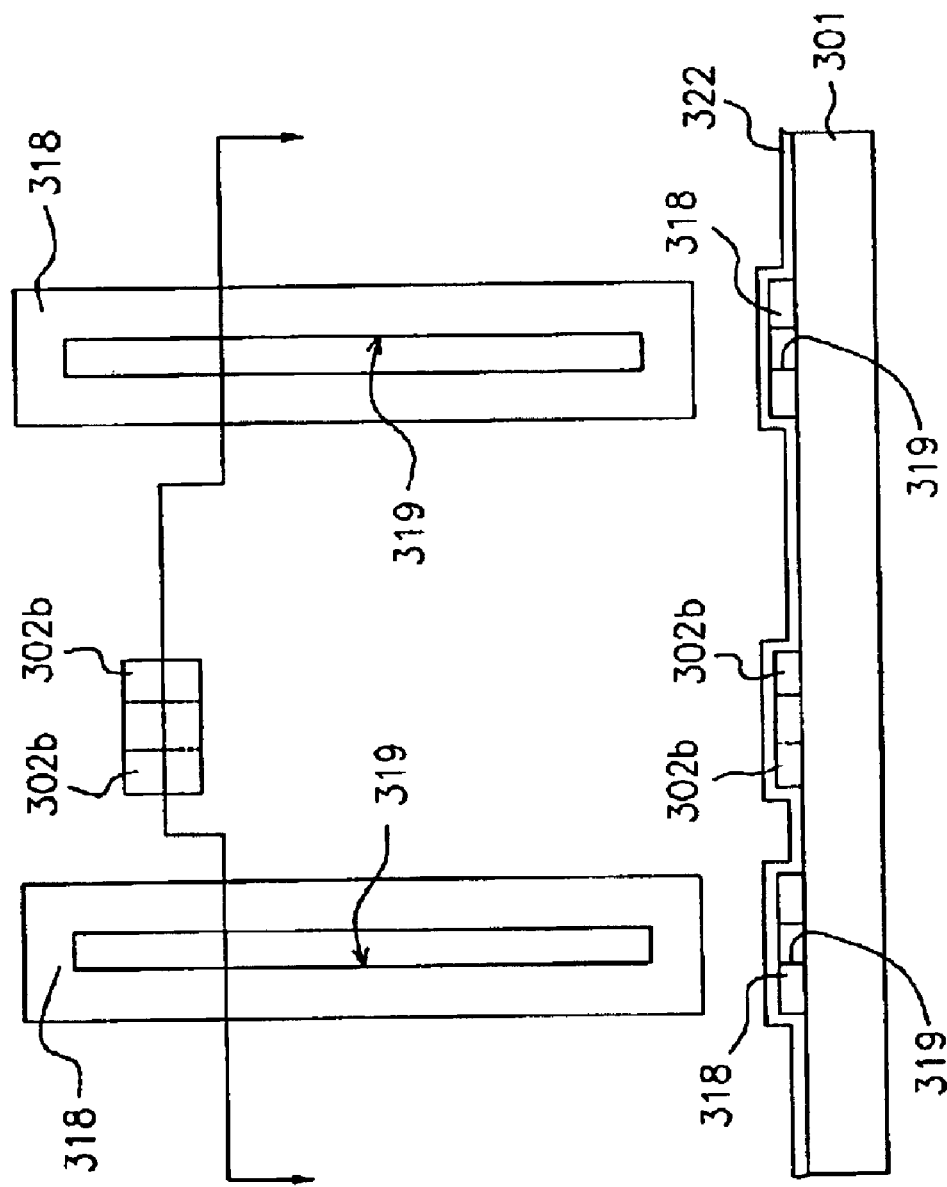
FIG. 10 is a schematic drawing of a doped polysilicon layer with an opening.
Figure 11:
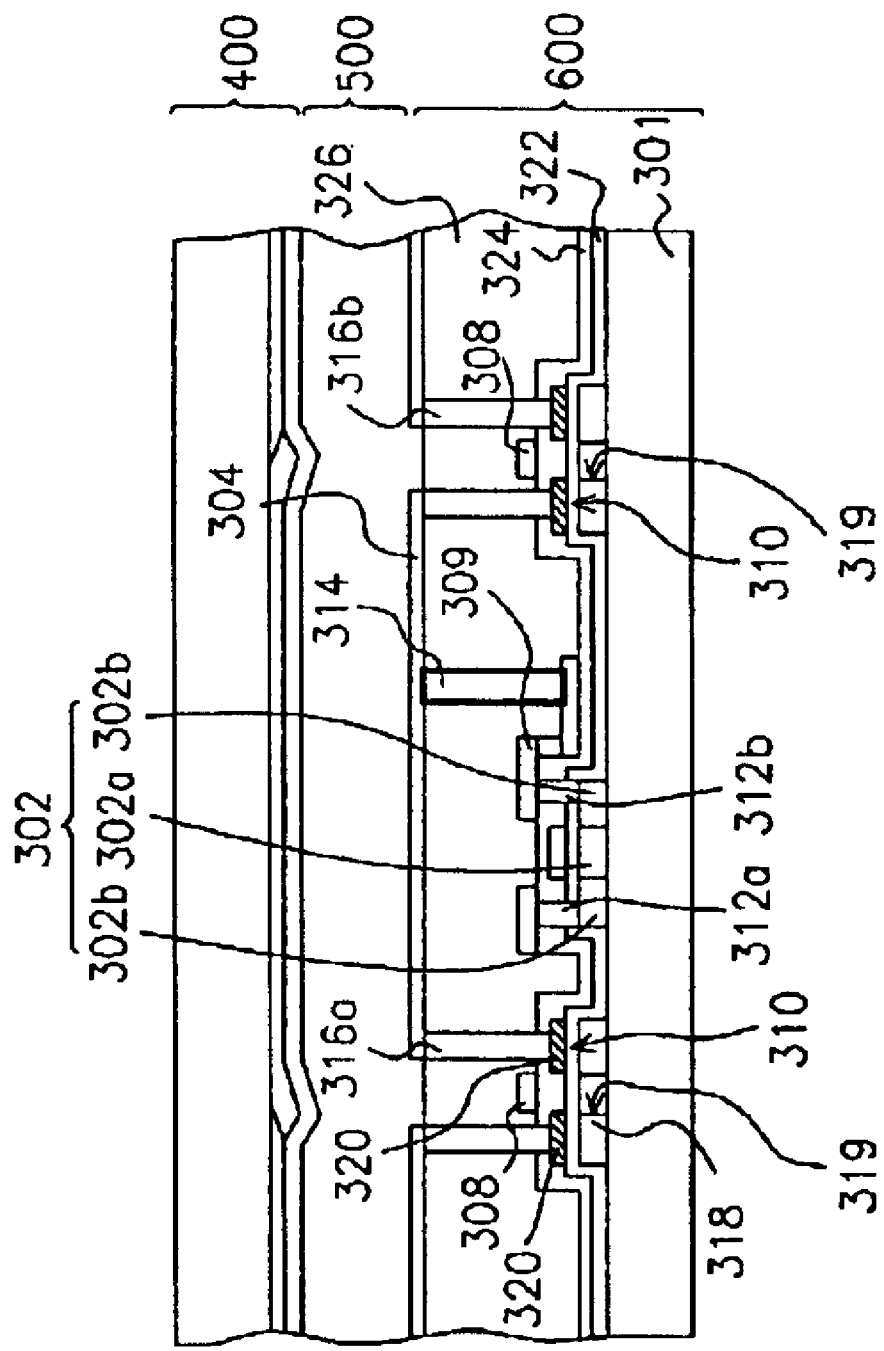
FIG. 11 is a cross sectional view showing the low-temperature polysilicon thin-film transistor liquid crystal display with respect to FIG. 10.

Referring to FIGS. 10 and 11, FIG. 10 shows the doped polysilicon layer with an opening, while FIG. 11 shows a cross sectional view of the LTPS TFT-LCD with respect to FIG. 10. To further suppress the parasitic capacitance between the doped polysilicon layer 318 and the signal line 308, the photomask determining the pattern of the doped polysilicon layer 318 is modified, such that an opening 319 is formed in the doped polysilicon layer 318 aligned under the signal line 308. The formation of the opening 319 further decreases the overlapping possibility of the doped polysilicon layer 318 and the signal line 308, such that the parasitic capacitance in between is further reduced.

According to the above, the pixel structure of a thin-film transistor liquid crystal display provided by the present invention has at least the following advantages.

1. In the pixel structure of the thin-film transistor liquid crystal display, the area of the storage capacitor is equivalent to the coverage of the shielding metal layer, so that the aperture ratio can be greatly enhanced.

2. In the pixel structure of the thin-film transistor liquid crystal display, the storage capacitor constructed by the shielding metal layer and the doped polysilicon layer has a capacitance Cst easily reaching CLC:Cst ranged between 1:1 to 1:4.

3. In the pixel structure of the thin-film transistor liquid crystal display, the black matrix is not required on the color filter substrate for light shielding.

4. While fabricating the pixel structure of the thin-film transistor liquid crystal display provided by the present invention, only minor modification is performed on the photomask without significantly increasing the fabrication cost.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A pixel structure of a thin-film transistor liquid crystal display, suitable to be formed on a transparent substrate, the pixel structure comprising:

a pixel, formed on the transparent substrate, the pixel having a low-temperature polysilicon thin-film transistor and a pixel electrode, wherein the low-temperature polysilicon thin-film transistor comprises a gate and a source/drain region having one side electrically connected to the pixel electrode;

a scan line, formed on the transparent substrate and electrically connected to the gate;

a signal line, formed on the transparent substrate and electrically to the other side of the source/drain region; and a storage capacitor, formed underneath the signal line, the storage capacitor having a doped polysilicon layer, a dielectric layer and a shielding metal layer, wherein the shielding metal layer is formed on the doped polysilicon layer and is electrically connected to the pixel electrode.

2. The pixel structure according to claim 1, wherein the source/drain region includes a polysilicon layer doped with N-type dopants.

3. The pixel structure according to claim 1, wherein the source/drain region includes a polysilicon layer doped with P-type dopants.

4. The pixel structure according to claim 1, wherein the doped polysilicon layer includes an N-type doped polysilicon layer.

5. The pixel structure according to claim 1, wherein the doped polysilicon layer includes a P-type doped polysilicon layer.

6. The pixel structure according to claim 1, wherein the doped polysilicon layer is connected to a DC voltage.

7. The pixel structure according to claim 1, wherein the doped polysilicon layer is connected to an AC voltage.

8. The pixel structure according to claim 1, wherein the shielding metal layer is made of a material selected from a group consisting molybdenum-tungsten alloy, chromium, and molybdenum.

9. The pixel structure according to claim 1, wherein the doped polysilicon layer has an opening aligned under the signal line.

10. A thin-film transistor array substrate, comprising a plurality of pixel structures as claimed in claim 1.

11. A thin-film transistor liquid crystal display, comprising the thin-film transistor array substrate as claimed in claim 10, a color filter substrate and a liquid crystal layer, wherein the liquid crystal layer is disposed between the thin-film transistor array substrate and the color filter substrate.

* * * * *